A. C. KREBS.
DEVICE FOR COUPLING TWO TRANSMISSION SHAFTS.
APPLICATION FILED DEC. 7, 1909.
976,187.
Patented Nov. 22, 1910.
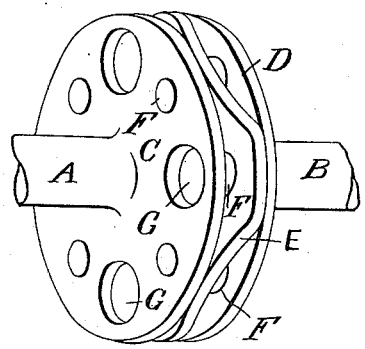
Witnesses
Inventor
Arthur Constantin Krebs.
By
Attorney

UNITED STATES PATENT OFFICE.

ARTHUR CONSTANTIN KREBS, OF PARIS, FRANCE, ASSIGNOR TO SOCIETE ANONYME DES ANCIENS ETABLISSEMENTS PANHARD ET LEVASSOR, OF PARIS, FRANCE.

DEVICE FOR COUPLING TWO TRANSMISSION-SHAFTS.

976,187.   Specification of Letters Patent.   Patented Nov. 22, 1910.

Application filed December 7, 1909. Serial No. 531,903.

*To all whom it may concern:*

Be it known that I, ARTHUR CONSTANTIN KREBS, a citizen of the Republic of France, residing in Paris, France, have invented new and useful Improvements in Devices for Coupling Two Transmission-Shafts, which improvements are fully set forth in the following specification.

My invention relates to means for coupling together a driving and a driven shaft arranged in alinement or substantial alinement, and consists more particularly stated in the provision of a non-metallic flexible connection secured to the ends of the said shafts.

Two non-flexible shafts each supported by two bearings, produce great friction in their bearings and heat them at the expense of the power transmitted, if the said bearings are not absolutely in line. Even if that condition is fulfilled when the shafts are at rest, deformation of the whole frame supporting the said shafts, when the driving and resisting strains act on it, is often sufficient to cause the shafts to move out of line and to cause heating and premature wear of the bearings. Moreover, in transmitting high speed, it is always advisable to avoid transmitting certain metallic vibrations produced by shocks or by rapid alternating movements of certain mechanism, to other apparatus which are more delicate, for instance to generators or motors.

The result in question is attained by the use of the device forming the subject of this invention, which does away with metallic connections between the two shafts and prevents vibrations from being transmitted from one to another.

The device in question is substantially as follows:—The ends of the shafts to be joined, facing each other, are provided with circular or cylindrical extended portions to which is secured alternately a membrane of suitable shape, of strong and flexible material such as leather, flexible fiber, suitably woven and prepared canvas or any other similar material. The dimensions of the said widened portions and the number of the points at which the material used for effecting the connection indicated is secured to them are in proportion to the strain to be transmitted.

The invention is illustrated in the accompanying drawing.

In the drawing, the two shafts A and B to be connected, terminate respectively in cylindrical flanges C and D facing each other, but arranged at a certain distance apart so as to avoid contact. Around their circumference is arranged a membrane E of the composition hereinbefore specified and secured to the said flanges by means of screws, rivets or bolts F, or even in certain cases simply by nails, so as to form a connection between the two shafts.

The diameter of the flanges, the number and the diameter of the parts for securing the membrane to the flanges, and the composition and strength of the said membrane are, as already stated, in proportion to the strain to be transmitted, so as to afford suitable security. The membrane inserted, owing to the pliability and facility of deformation which it has, transmits the torque to which the shafts are submitted from one to the other of the said two shafts without any components normal to the axis being produced, which result in friction in the bearings and injurious heating, as in the case when metallic and rigid couplings are used with shafts which are not absolutely in line.

In the construction shown, the two disks C and D terminating the shafts A and B to be connected, are disks to which the membrane E hereinbefore indicated is alternately secured by means of screws, rivets, bolts or the like, the said securing parts being indicated at F. Each disk is provided, opposite the point of securing the membrane to the opposite disk, with an aperture G for facilitating the said securing.

Having now particularly described and ascertained the nature of my said invention and in what manner the same is to be performed, I declare that what I claim is:—

Power-transmitting means, comprising the combination of a driving shaft and a driven shaft arranged in substantial alinement with each other, the ends of each shaft being provided with a plain, circular flange, and a non-metallic, flexible, circular diaphragm of equal diameter with said flanges, placed between the latter, and rivets securing said diaphragm alternately to one and the other of said flanges, so that it assumes an undulated form.

In testimony whereof I have signed this specification in the presence of two subscribing witnesses.

ARTHUR CONSTANTIN KREBS.

Witnesses:
EMILE LEDRET,
H. C. COXE.